(12) United States Patent
Ishigami

(10) Patent No.: US 7,960,739 B2
(45) Date of Patent: Jun. 14, 2011

(54) OPTICAL MODULE AND PRODUCTION METHOD THEREFOR

(75) Inventor: Yoshiaki Ishigami, Hitachi (JP)

(73) Assignee: Hitachi Cable, Ltd., Chiyoda-ku, Tokyo (JP)

( * ) Notice: Subject to any disclaimer, the term of this patent is extended or adjusted under 35 U.S.C. 154(b) by 785 days.

(21) Appl. No.: 11/822,987

(22) Filed: Jul. 11, 2007

(65) Prior Publication Data

US 2008/0013959 A1 Jan. 17, 2008

(30) Foreign Application Priority Data

Jul. 12, 2006 (JP) .................................. 2006-191581

(51) Int. Cl.
*H01L 29/72* (2006.01)

(52) U.S. Cl. ............ 257/81; 257/98; 257/434; 257/680; 257/692; 257/704; 257/779

(58) Field of Classification Search .................... 257/81, 257/98, 434, 680, 692, 704, 779
See application file for complete search history.

(56) References Cited

U.S. PATENT DOCUMENTS

| 6,465,858 | B2 | 10/2002 | Iida et al. |
| 6,858,882 | B2* | 2/2005 | Tsuda et al. ................... 257/103 |
| 6,980,184 | B1* | 12/2005 | Stewart et al. .................. 345/87 |
| 6,982,437 | B2 | 1/2006 | Gallup et al. |
| 7,004,644 | B1 | 2/2006 | Johnson |
| 2001/0023970 | A1 | 9/2001 | Iida et al. |
| 2004/0043540 | A1* | 3/2004 | Kinsman ...................... 438/125 |
| 2006/0081983 | A1* | 4/2006 | Humpston et al. ............ 257/738 |

FOREIGN PATENT DOCUMENTS

| JP | 2001-339077 | 12/2001 |
| JP | 2002-076497 | 3/2002 |
| JP | 2003-503858 | 1/2003 |
| JP | 2003-043311 | 2/2003 |
| JP | 2005-292739 | 10/2005 |
| JP | 2005-321651 | 11/2005 |

OTHER PUBLICATIONS

Japanese Office Action dated Aug. 24, 2010 with an English translation.

* cited by examiner

*Primary Examiner* — Edward Wojciechowicz
(74) *Attorney, Agent, or Firm* — McGinn IP Law Group, PLLC

(57) ABSTRACT

An optical transmitter includes a package including a cavity formed at an upper part thereof, a light transparent member disposed on the package, and a flexible substrate including a circuit pattern formed on at least one side thereof and being placed on a back surface of the light transparent member.

10 Claims, 11 Drawing Sheets

*FIG.5*
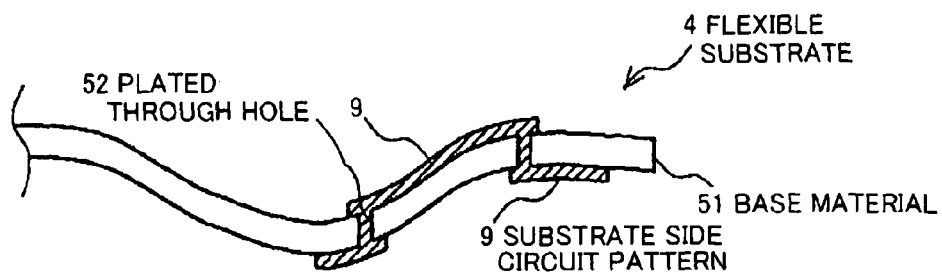
*FIG.6A*  *FIG.6B*  *FIG.6C*
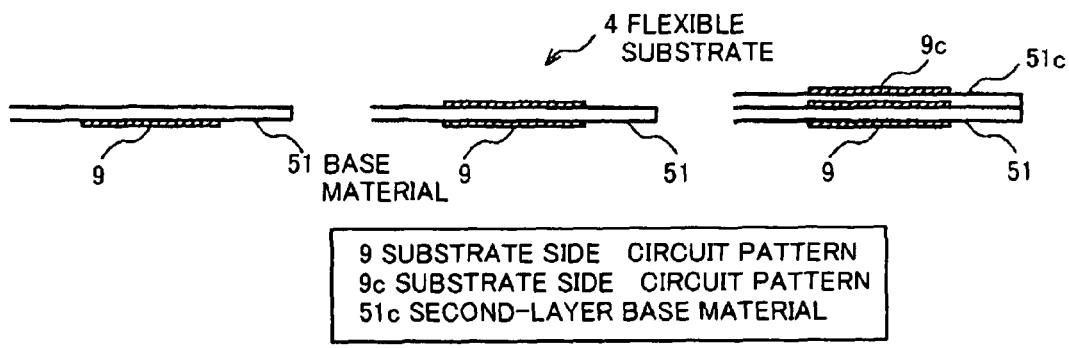
*FIG.7*
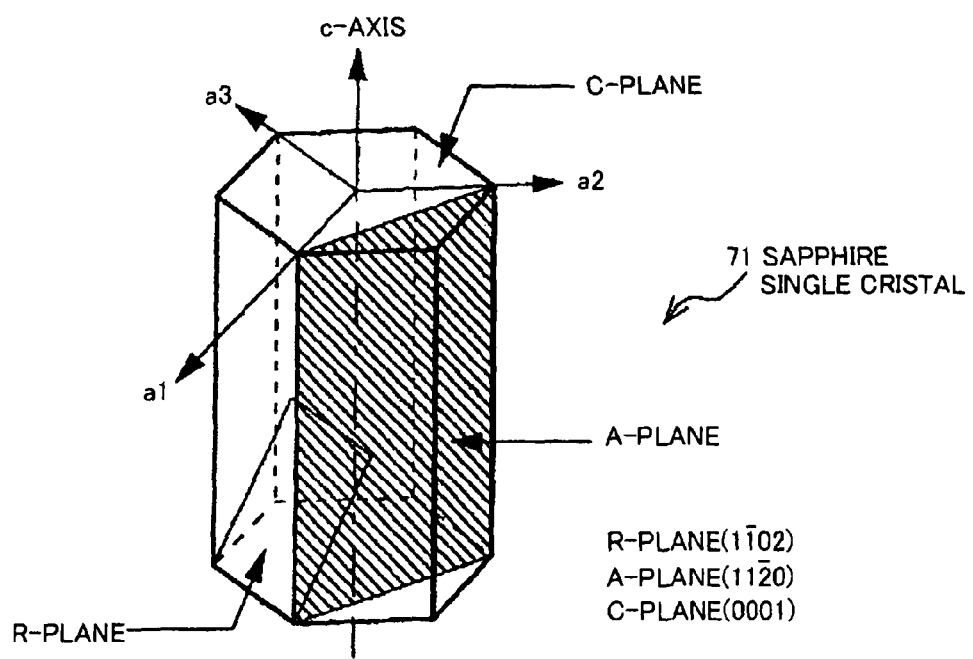

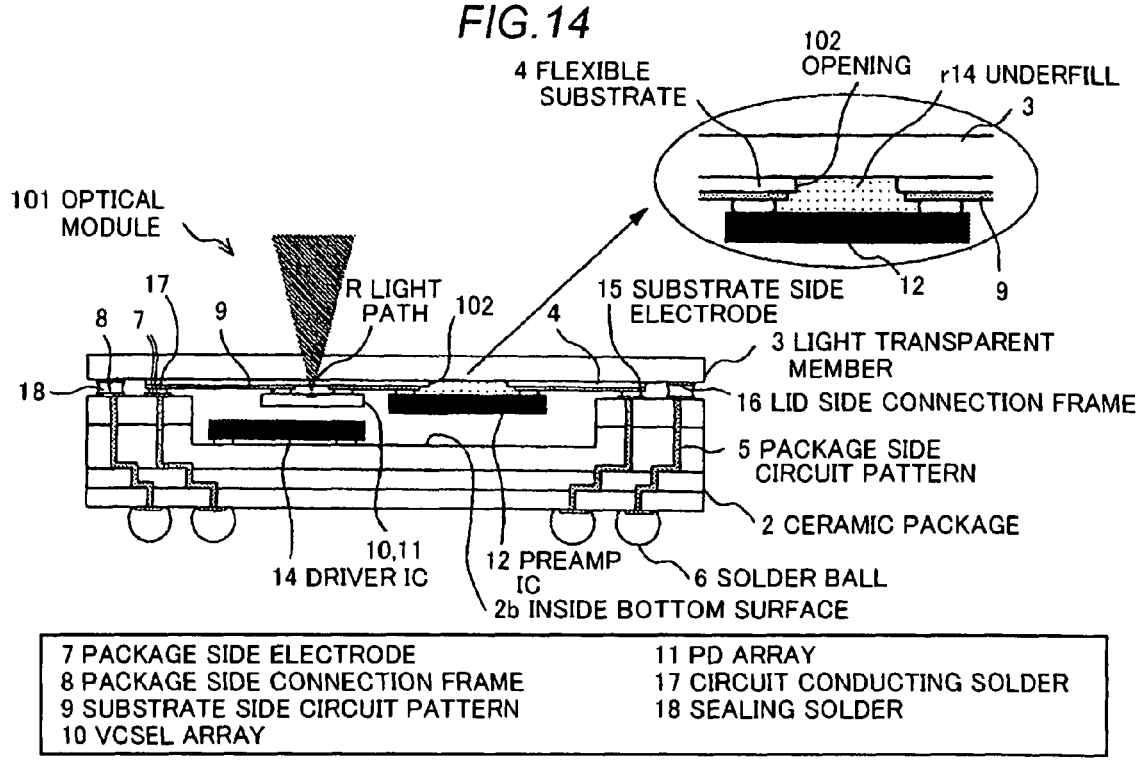
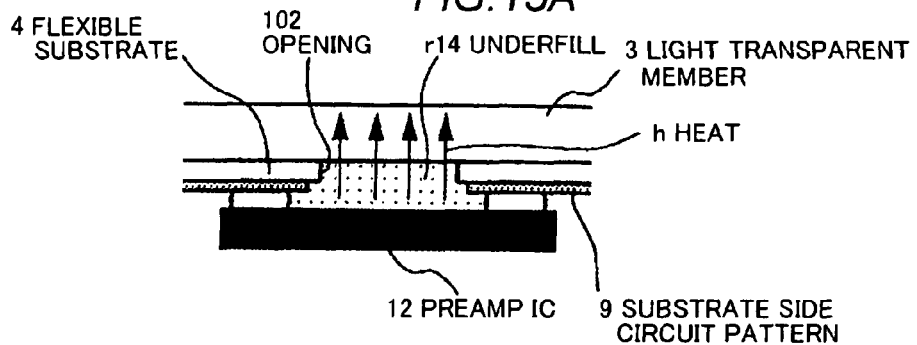
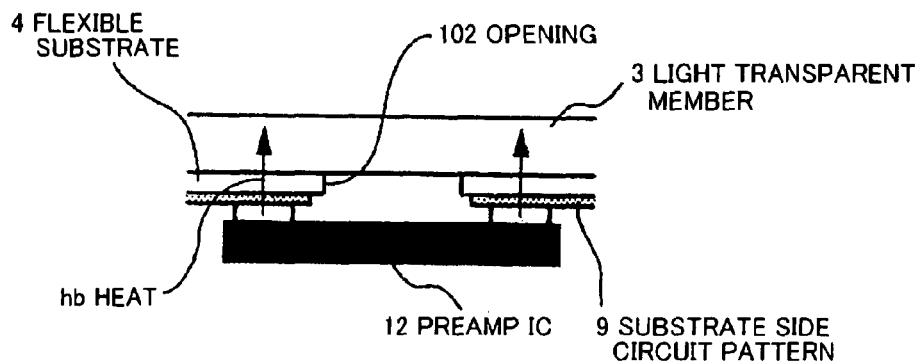

OPTICAL MODULE AND PRODUCTION METHOD THEREFOR

The present application is based on Japanese Patent Application No. 2006-191581 filed on Jul. 12, 2006, the entire contents of which are incorporated herein by reference.

BACKGROUND OF THE INVENTION

1. Field of the Invention

This invention relates to an optical module used for an optical interconnection.

2. Description of the Related Art

In recent years, optical interconnection, which is a technology for transmitting a signal at high speed in a system apparatus or between system apparatuses, has grown. That is, the optical interconnection is a technology to treat an optical component as if it is an electrical component, and to surface-mount the optical component on a mother board or a circuit substrate of a PC, a vehicle, or an optical transceiver.

As a conventional optical transceiver used for the optical interconnection, an optical module 191 is shown in FIG. 19 (e.g., referring to JP-A-2005-292739).

The optical module 191 includes a substrate 192 having a cavity which is open at an upper part of the substrate 192, a transparent plate 194, including a glass or a sapphire glass, having a circuit pattern 193 on one surface of the transparent plate 194, and an optical element 195 (photoelectric conversion element) mounted on the circuit pattern 193. The optical module 191 is hermetically sealed by connecting the substrate 192 with the transparent plate 194. Further, a fiber block 196 is mounted on the optical module 191.

However, in the conventional optical module 191, it is difficult to form the circuit pattern 193 on the transparent plate 194.

Further, when the circuit pattern 193 is formed on the transparent plate 194 made of glass or sapphire glass, since it is difficult to form a through-hole in the transparent plate 194, the circuit pattern 193 cannot be formed on both sides of the transparent plate 194, and thus, the transparent plate 194 having the circuit pattern 193 only on one side thereof can be used.

Consequently, a circuit area of the transparent plate 194 becomes large, and thus, the entire optical module 191 becomes large.

A reason that it is difficult to form the through-hole in the transparent plate 194 is that a material such as glass or sapphire glass is hard, and it is difficult to form a fine hole. Further, even if the fine hole is formed, a crack may occur in the transparent plate 194.

Further, even if the fine hole is formed, it is necessary to fill an inside of the through-hole by a metal plating such as Cu or Au in order to place the optical element 195 on the substrate 192 and to hermetically seal the optical element 195. However, since a linear expansion coefficient of the glass or the sapphire glass is much less than that of the metal, a detachment of the metal occurs by a temperature cycle, and the hermetic seal is broken.

SUMMARY OF THE INVENTION

In view of the foregoing and other exemplary problems, drawbacks, and disadvantages of the conventional methods and structures, an exemplary feature of the present invention is to provide an optical module (and a method therefor) having a small size.

According to one exemplary aspect of the invention, an optical module includes:

a package including a cavity formed at an upper part thereof;

a light transparent member disposed on the package; and a flexible substrate including a circuit pattern formed on at least one side thereof, the flexible substrate being placed on a back surface of the light transparent member.

According to another exemplary aspect of the invention, a method of producing an optical module includes:

forming a cavity at an upper part of a package;

disposing a light transparent member on the package;

forming a circuit pattern on at least one side of a flexible substrate; and placing the flexible substrate on a back surface of the light transparent member.

According to the present invention, by use of a flexible substrate, an optical module having a small size can be achieved.

The above exemplary modifications may be made alone or in any combination thereof.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 5 is a sectional view of the flexible substrate 4;

FIGS. 6A-6C are sectional views showing exemplary flexible substrates 4;

FIG. 7 is a view showing a unit cell of sapphire;

FIG. 14 is a sectional view and an enlarged sectional view showing the completed optical module 101 of FIG. 10;

FIG. 15A is an enlarged sectional view showing a heat radiation of the optical module 101 shown in FIG. 10;

FIG. 15B is an enlarged sectional view showing the heat radiation of the optical module 101 when no underfill;

DETAILED DESCRIPTION OF THE EXEMPLARY EMBODIMENTS

Figure 1:
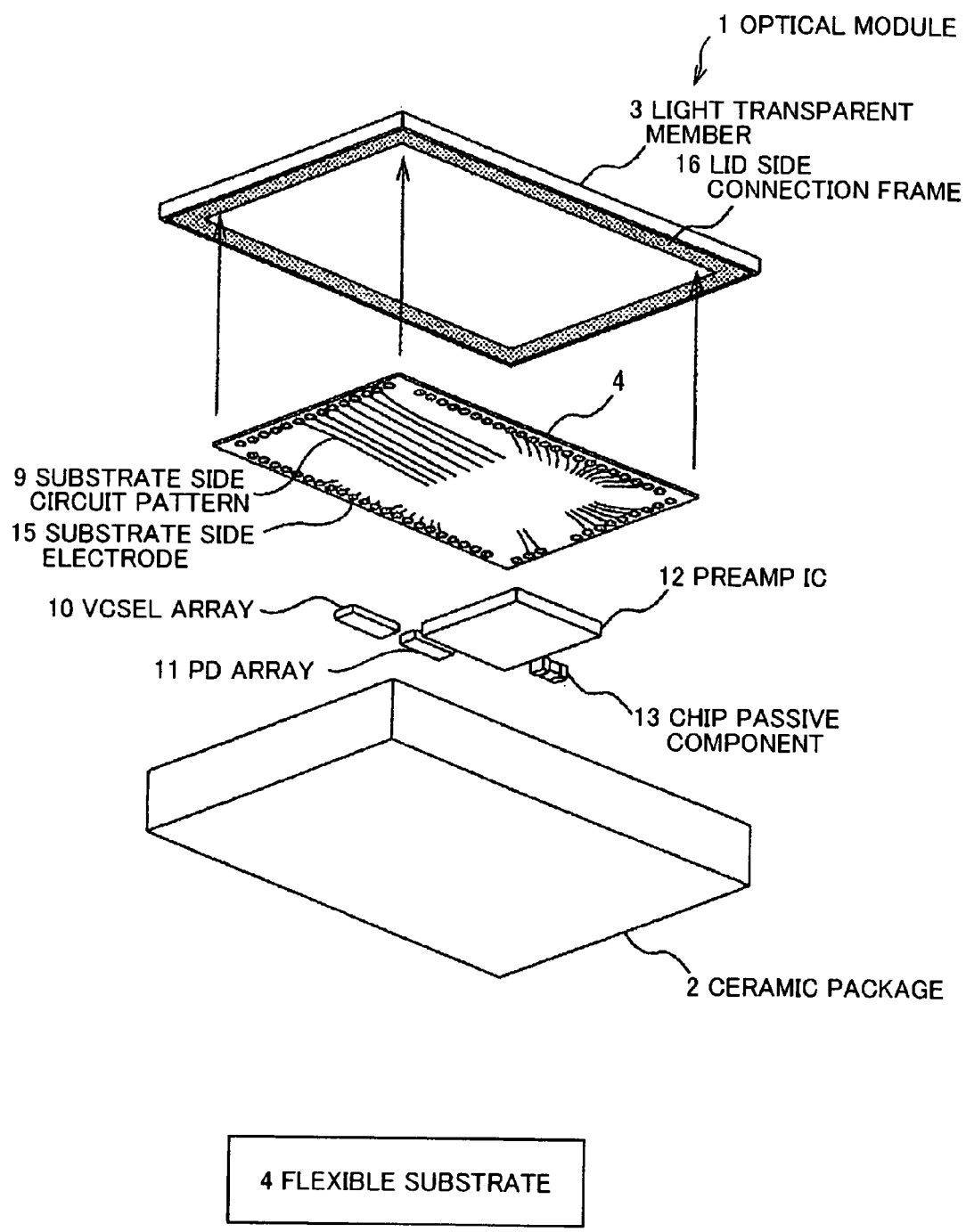
FIG. 1 is an exploded perspective view showing an optical module 1 in a first exemplary embodiment according to the present invention.

Referring now to the drawings, and more particularly to FIGS. 1-19, there are shown exemplary embodiments of the methods and structures according to the present invention.

Exemplary Embodiment 1

Figure 2:
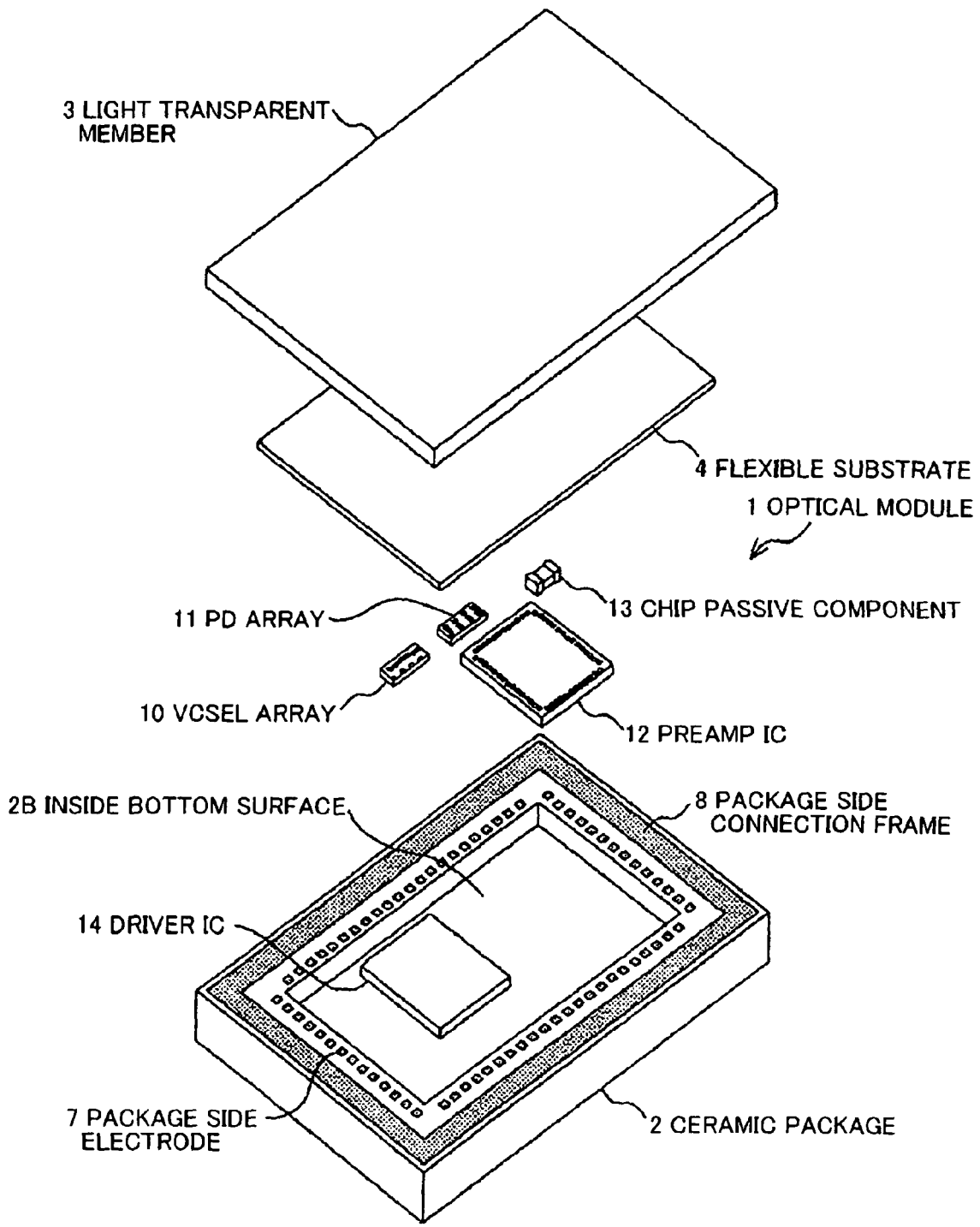
FIG. 2 is an exploded perspective view showing the optical module 1 of FIG. 1 from above.
Figure 9:
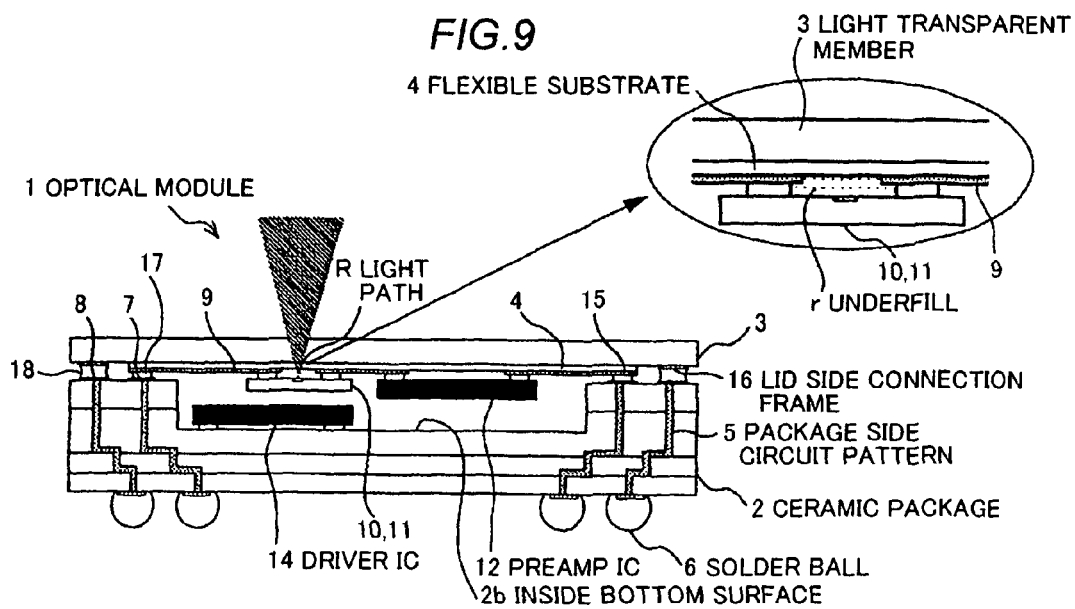
FIG. 9 is a sectional view and an enlarged sectional view showing the completed optical module 1 of FIG. 1.
Figure 10:
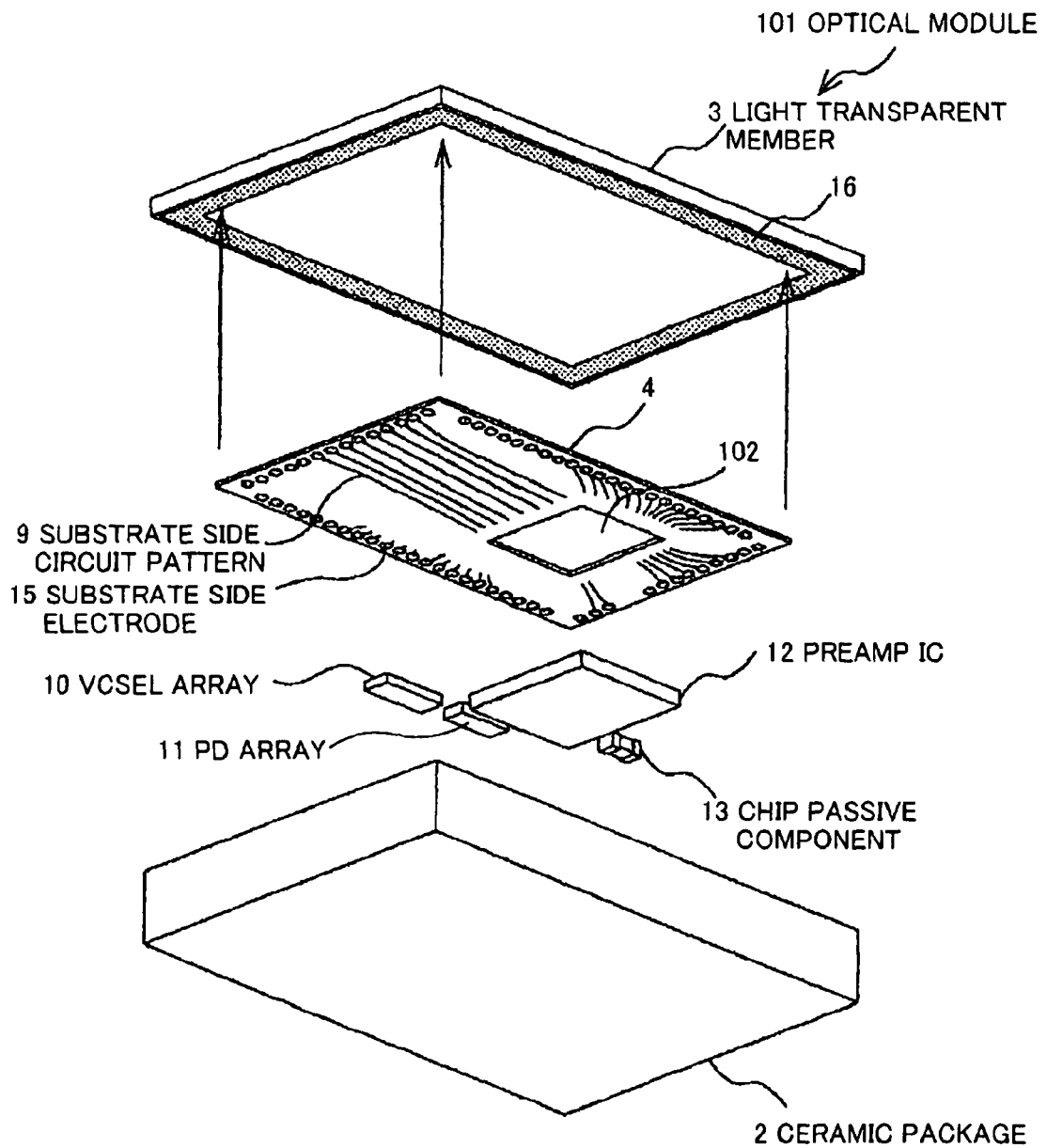
FIG. 10 is an exploded perspective view showing an optical module 101 in a second exemplary embodiment according to the present invention.
Figure 11:
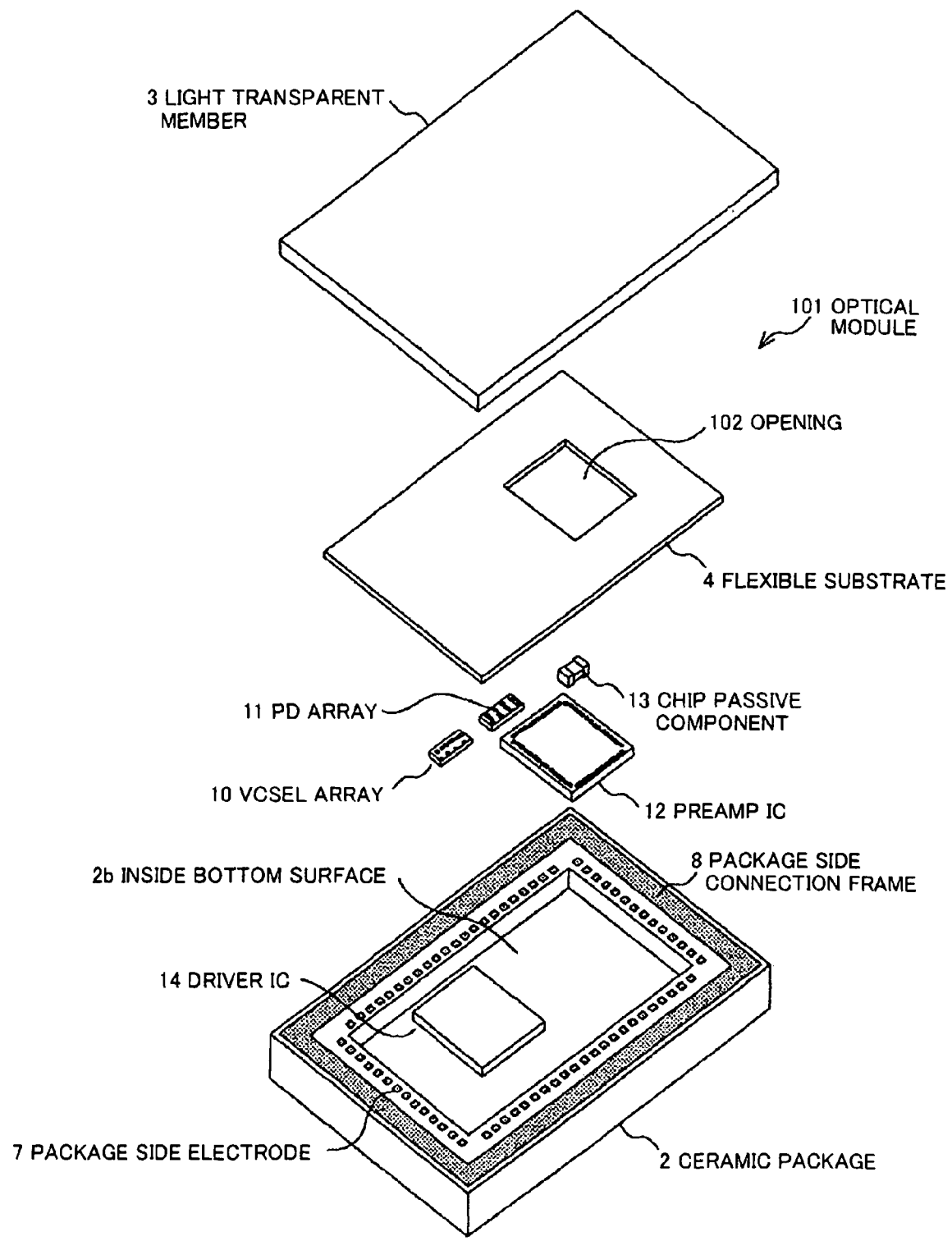
FIG. 11 is an exploded perspective view showing the optical module 101 of FIG. 10 from above.
Figure 12:
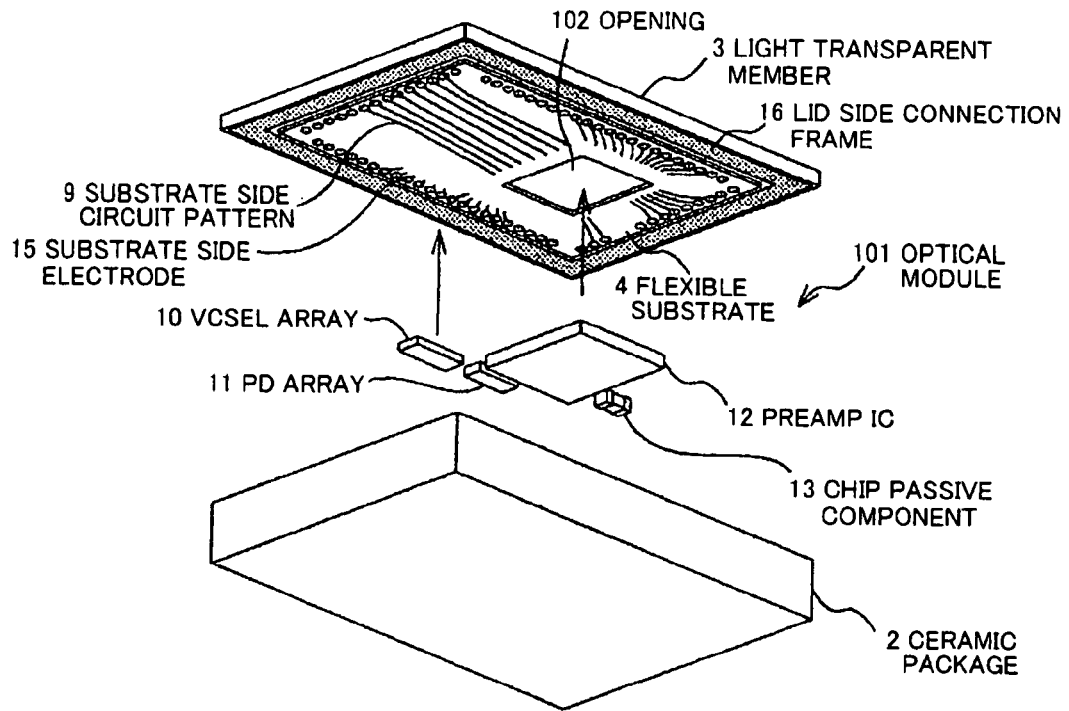
FIG. 12 is an exploded perspective view showing a production method of the optical module 101 shown in FIG. 10.
Figure 13:
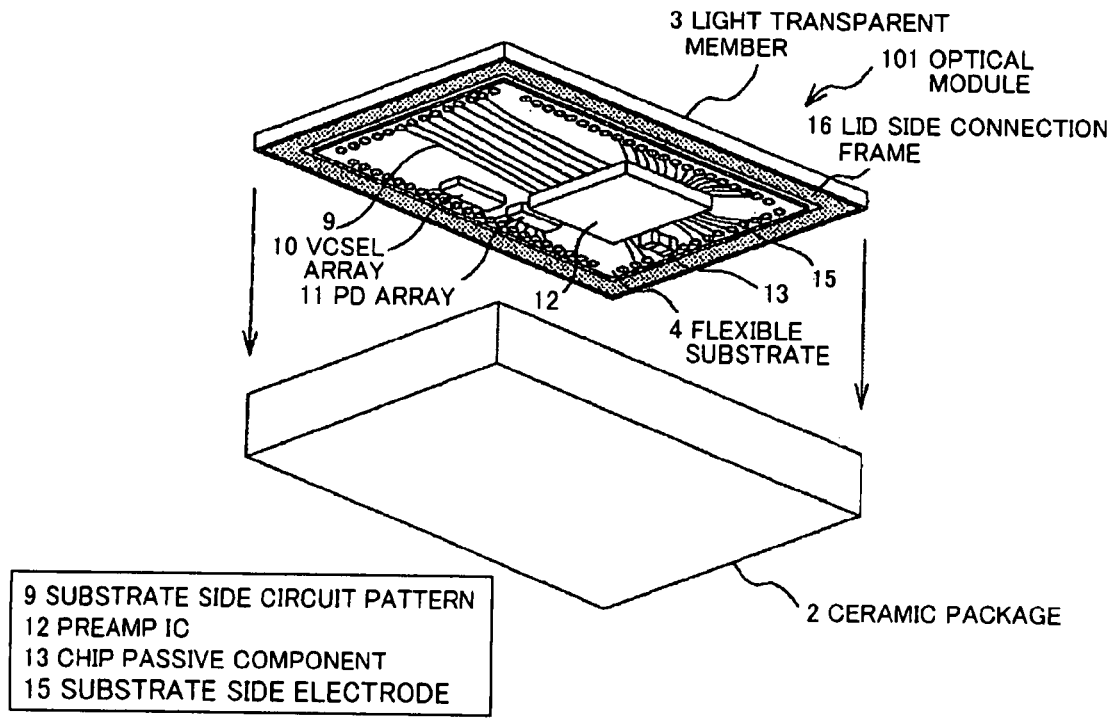
FIG. 13 is an exploded perspective view showing the production method of the optical module 101 shown in FIG. 10.
Figure 16A:
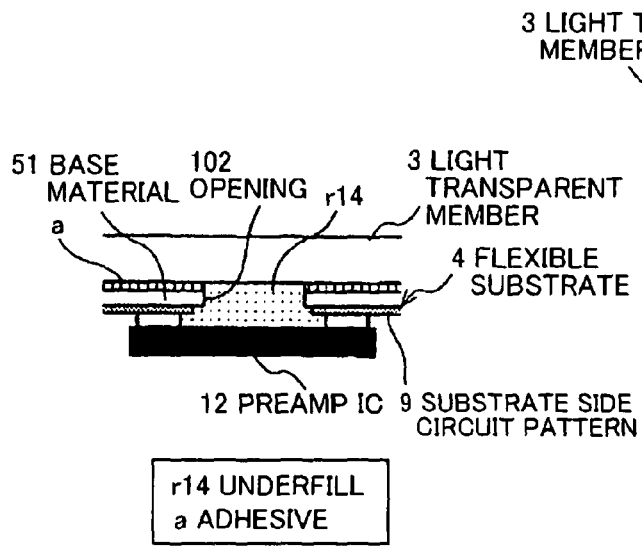
FIG. 16A is an exploded detailed perspective view showing the optical module 101 shown in FIG. 10.
Figure 16B:
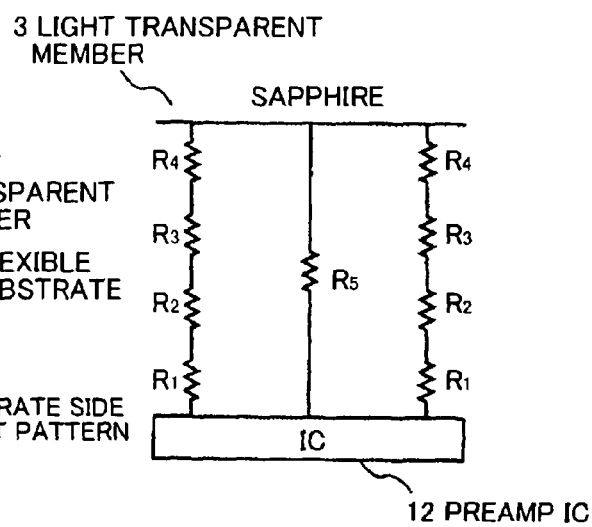
FIG. 16B is a circuit diagram showing a thermal resistance thereof.

FIG. 1 is an exploded perspective view showing an optical module 1 in a first exemplary embodiment according to the present invention, FIG. 2 is an exploded perspective view showing the optical module 1 of FIG. 1 from above, and FIG. 9 is a sectional view and an enlarged sectional view showing the completed optical module 1 of FIG. 1.

As shown in FIGS. 1, 2 and 9, the optical module 1 (hermetically sealed, parallel optical module) according to the first exemplary embodiment is surface-mounted on a mother board or a circuit substrate of an apparatus such as a personal computer (PC), a vehicle, or an optical transceiver, and an area thereof is less than 1 cm-by-1 cm.

The optical module 1 mainly includes a ceramic package 2 having a cavity (dent, space) which is open at an upper part thereof and has a concave cross-sectional shape, a light transparent member (a sealing transparent plate or a lid) 3 covering the ceramic package 2, and a transparent flexible substrate 4. The light transparent member 3 is transparent (i.e., including an interfacial reflection, a rate of light transmission is, when a thickness is 1 mm, more than 80%) with respect to light in range of an optical communication wavelength, the flexible substrate 4 is transparent with respect to light in a range of the optical communication wavelength.

The reason why the ceramic package 2 is used as a package is to keep a level of hermetically sealing less than $10^{-9}$ Pa·m$^3$/s[He] in a leak test while the package is hermetically sealed.

A package side circuit pattern 5 is formed inside of the ceramic package 2 (referring to FIG. 9). A part of the circuit pattern 5 is formed so as to connect a surface frame and a back surface of the ceramic package 2. On the back surface of the ceramic package 2, a plurality of solder balls 6 (referring to FIG. 9) for mounting the optical module 1 on the mother board or the circuit substrate of the apparatus are formed in a grid pattern. That is, the ceramic package 2 constitutes a BGA (Ball Grid Array) solder.

On the surface frame of the ceramic package 2, a plurality of package side electrodes 7 conducting with the circuit pattern 5 are formed side by side. Around the package side electrodes 7 of the ceramic package 2, a package side connection frame (package side sealing metallizing) 8 is formed by metal such an Au/Ni. The package side electrodes 7 and the package side connection frame 8 are collectively formed by photo-etching of such an Au/Ni plating.

As the light transparent member 3, an inorganic material substrate made of a silica-based glass, a single crystal of alumina (Al$_2$O$_3$) (i.e., a sapphire glass), a ruby, or an industrial diamond is used.

Specifically, the inorganic material substrate, which has a thermal conductivity more than 20 W/(m·k), preferably, has a thermal conductivity more than 20 W/(m·k) and less than 50 W/(m·k), is exemplarily used as the light transparent member 3. Therefore, in this exemplary embodiment, a sapphire glass substrate is used as the light transparent member 3.

Further, the inorganic material substrate as the light transparent member 3 is exemplarily able to suppress a temperature rise of an optical component such as an optical element for light-emitting or light-receiving, or a semiconductor chip within 10° C. with respect to a temperature of a back surface of the light transparent member 3 which is defined as a reference position, when an output of the light-emitting element (e.g., a VCSEL (Vertical Cavity Surface Emitting Laser) array 10 as mentioned below) is 0.1 mW and a power consumption of a drive circuit (e.g., a driver IC 14 as mentioned below) for driving the light-emitting element is 0.5 mW.

Since the thermal conductivity of the silica-based glass is low (1 to 2 W/(m·k)), when the optical element or the semiconductor chip is mounted on the light transparent member 3, the temperature of the optical element or the semiconductor chip will increase more than 100° C., and it will cause a "glitch" (defect) after manufacturing. Although it is possible to decrease a thermal resistance by thickening the light transparent member 3, a distance between the optical element and an external optical system (e.g., lens) becomes longer. The thickness of the light transparent member 3 is exemplarily as thin as possible, in so far as keeping a strength thereof.

On the other hand, since the thermal conductivity of the sapphire glass is 33.5 W/(m·k) which is extremely high, the sapphire glass can suppress the temperature rise of the optical element or the semiconductor chip within 10° C. Further, the sapphire glass has an excellent transparency with respect to a broad range of light wavelengths, and can transmit an optical signal having low loss.

Further, a light transmission rate and a thermal conductivity is important for the sapphire glass, and a crystallinity (single crystal having an ordered crystal orientation) which is important for use as a semiconductor thin film substrate, is not important. Therefore, the sapphire glass substrate in which at least one of crystal plain orientations is shifted over 0.5°, is exemplarily used as the light transparent member 3. Thereby, the optical module 1 can be manufactured at low cost.

The sapphire glass substrate used in the exemplary embodiment is described in more detail below. "Sapphire" means a single crystal of alumina (Al$_2$O$_3$) having a plain orientation and is transparent. The alumina is, when becoming polycrystal, called "alumina ceramics". The "sapphire" is used mainly as the semiconductor thin film substrate such as GaN. When used as the semiconductor thin film substrate, the plain orientation is strictly controlled and generally less than 0.5°. That is, as a sapphire single crystal 71 shown in FIG. 7, in a hexagonal crystal, a shift of the plain orientation from an A-plane, C-plane, and R-plane is less than 0.5°.

As the light transparent member 3 according to this exemplary embodiment, for instance, the sapphire substrate which is manufactured as the semiconductor thin film substrate by an EFG (Edge-Defined Film-fed Growth) method and can be obtained as a defective (NG) product having low price, can be used. Although a linear expansion coefficient of the "sapphire" is different according to the plane orientation (e.g., parallel to the C-axis: $7.7 \times 10^{-6}$, perpendicular to the C-axis: $7.0 \times 10^{-6}$), it does not matter for use as this exemplary embodiment.

As shown in FIG. 5, the flexible substrate 4 includes a base material (insulator film) 51 which has a flexibility and an electrical isolation, and which is transparent with respect to light in a range of the optical communication wavelength, and a substrate side circuit pattern 9 formed on at least one side of the base material 51. In this exemplary embodiment, the two-layer flexible substrate 4 in which the substrate side circuit pattern 9 is formed on the both sides of the one-layer base material 51, is used. A thickness of the flexible substrate 4 may be equal to or less than 0.1 mm.

With respect to the number of layers, the flexible substrate 4 in which the circuit pattern 9 is formed on one side of the one-layer base material 51 is a one-layer structure, as shown in FIG. 6A. The flexible substrate 4 in which the circuit pattern 9 is formed on the both sides of the one-layer base material 51 is a two-layer structure, as shown in FIG. 6B. The flexible substrate 4 in which a second-layer base material 51c is laminated on the flexible substrate of the FIG. 6B and the circuit pattern 9 is formed on the second-layer base material 51, is a three-layer structure, as shown in FIG. 6C.

As a material of the base material 51, a commonly used polyimide can be used. The light transmission rate of the polyimide is, for example, 98.5 to 100% with respect to light having a wavelength of 700 nm. Thus, the polyimide is substantially transparent (i.e., the light in a range of the optical communication wavelength hardly attenuates). The substrate side circuit pattern 9 is, for example, formed collectively by photo-etching a Cu plating. FIGS. 1 and 2 illustrate examples forming the substrate side circuit pattern 9 on one side of the base material 51.

When the substrate side circuit pattern 9 is formed on both sides of the base material 51, a plated through hole 52 for conducting between the substrate side circuit patterns 9 formed on both sides of the base material 51 is formed. The plated through hole 52 is formed by filling a metal such as Cu and/or Au inside of the through hole formed in the base material 51 by plating.

In this case, it is possible to form a solid ground layer (overall ground layer) as the substrate side circuit pattern 9 on a surface of the base material 51 except where a light path R (referring to FIG. 9) is formed. The solid ground layer is conducted with the package side circuit pattern 5 of the ceramic package 2, or a ground of the mother board or the circuit substrate.

Figure 4:
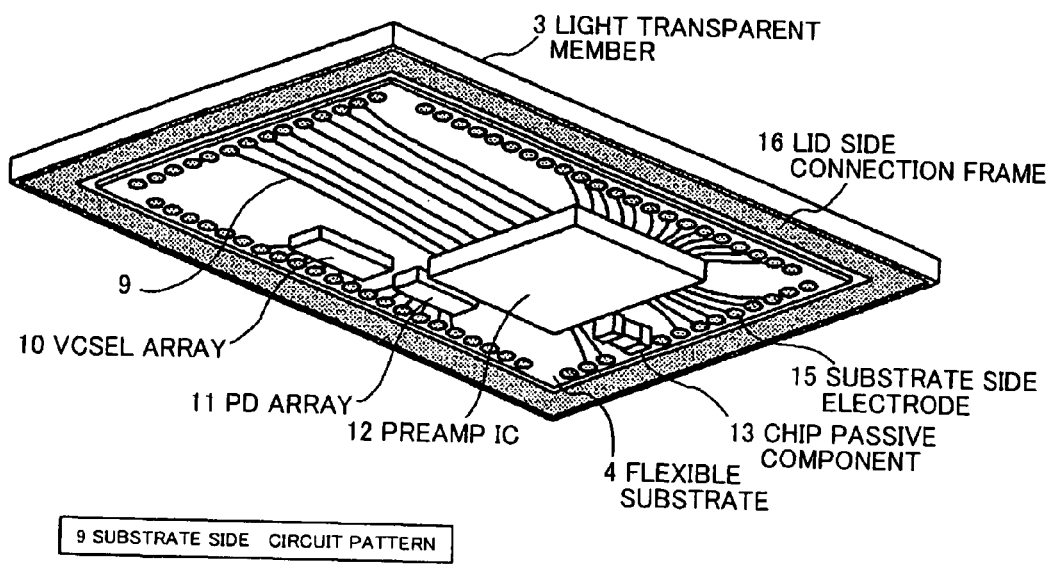
FIG. 4 is a perspective view showing a flexible substrate 4 mounting an optical element and an amplifier circuit.

As shown in FIGS. 1 and 4, the flexible substrate 4 is fixed to the back surface of the light transparent member 3 by pasting with an adhesive which is transparent with respect to the light in range of the optical communication wavelength. As the adhesive, a hot adhesive, or an ultraviolet (UV) curing adhesive can be used.

As shown in FIGS. 1, 4 and 9, the substrate side circuit pattern 9 of the flexible substrate 4 mounts a Vertical Cavity Surface Emitting Laser (VCSEL) array 10 as a light-emitting (transmission) optical element, which includes four laser diodes arrayed in narrow pitch (e.g., 250 µm), a photo diode (PD) array 11 as a light-receiving (reception) optical element, which includes four PDs arrayed in narrow pitch (e.g., 250 µm), a preamp IC (PD drive circuit IC) 12 as an amplifier circuit for amplifying an electric signal outputted from each PD of the PD array 11, and a chip passive component 13 such a resistance and a capacitance.

The VCSEL array 10 is flip-chip mounted on the back surface of the flexible substrate 4. That is, the VCSEL array 10 is mounted so that a light-emitting area of each LD thereof will face the flexible substrate 4. The PD array 11 is also flip-chip mounted on the back surface of the flexible substrate 4. That is, the PD array 11 is mounted so that a light-receiving area of each PD thereof will face the flexible substrate 4.

As shown in FIGS. 2 and 9, a driver IC (LD drive circuit IC) 14 as a drive circuit for driving each LD of the VCSEL array 10, is mounted on an inside bottom surface 2b of the ceramic package 2.

As shown in FIGS. 1, 4 and 9, a plurality of substrate side electrodes 15 are formed on a frame of the back surface of the flexible substrate 4. The substrate side electrodes 15 are connected with the substrate side circuit pattern 9, the VCSEL array 10, the PD array 11, and the preamp IC 12. The substrate side electrodes 15 are, for example, collectively formed by photo-etching, for example, an Au/Ni plating.

On a frame of the back surface of the light transparent member 3, a light transparent member side connection frame (lid side connection frame, lid side sealing metallizing) 16 is formed by metal such as Au/Ni. The lid side connection frame 16 is, for example, collectively formed by photo-etching, for example, an Au/Ni plating.

As shown in FIG. 9, in a gap between the light transparent member 3 and the VCSEL array 10, an underfill r which has a refractive index of 1.5 substantially the same as the light transparent member 3, and is transparent with respect to light in a range of the optical communication wavelength, is filled. An epoxy resin may be used as the underfill r. The underfill r is cured by heat treatment after being filled in the gap. Similarly, in a gap between the light transparent member 3 and the PD array 11, a transparent underfill may be filled.

Further, concerning the optical module 1, an integrated lens block (not shown) having eight lenses for condensing outgoing lights from each LD of the VCSEL array 10 or incoming lights to each PD of the PD array 11 is mounted on the surface of the light transparent member 3 which is located above the light path R. An MT (Mechanically Transferable) optical connector (not shown) which is connected to eight optical fibers, is connected to the lens block.

Next, a production method (assembling method) of the optical module 1 is described below.

Figure 3:
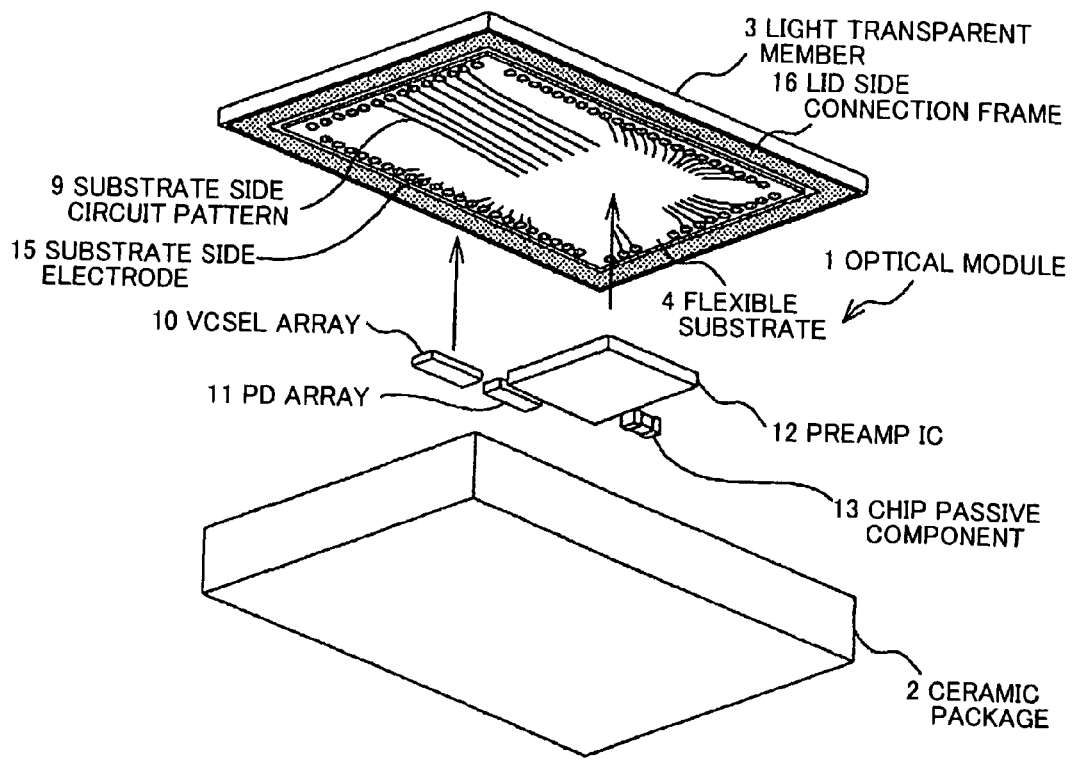
FIG. 3 is an exploded perspective view showing a production method of the optical module 1 shown in FIG. 1.

First of all, as shown in FIG. 1, a surface of the flexible substrate 4 is fixed (e.g., pasted) to the back surface of the light transparent member 3 by an adhesive. As shown in FIG. 3, optical components and electric components are flip-chip mounted on the back surface of the pasted flexible substrate 4, and as shown in FIG. 2, the driver IC 14 is mounted on the inside bottom surface 2b of the ceramic package 2.

Thereafter, a molten circuit conducting solder 17 (referring to FIG. 9) is preliminarily applied to one of the package side electrode 7 and the substrate side electrode 15, a molten sealing solder 18 (referring to FIG. 9) is applied to one of the package side connection frame 8 and the lid side connection frame 16.

Figure 8:
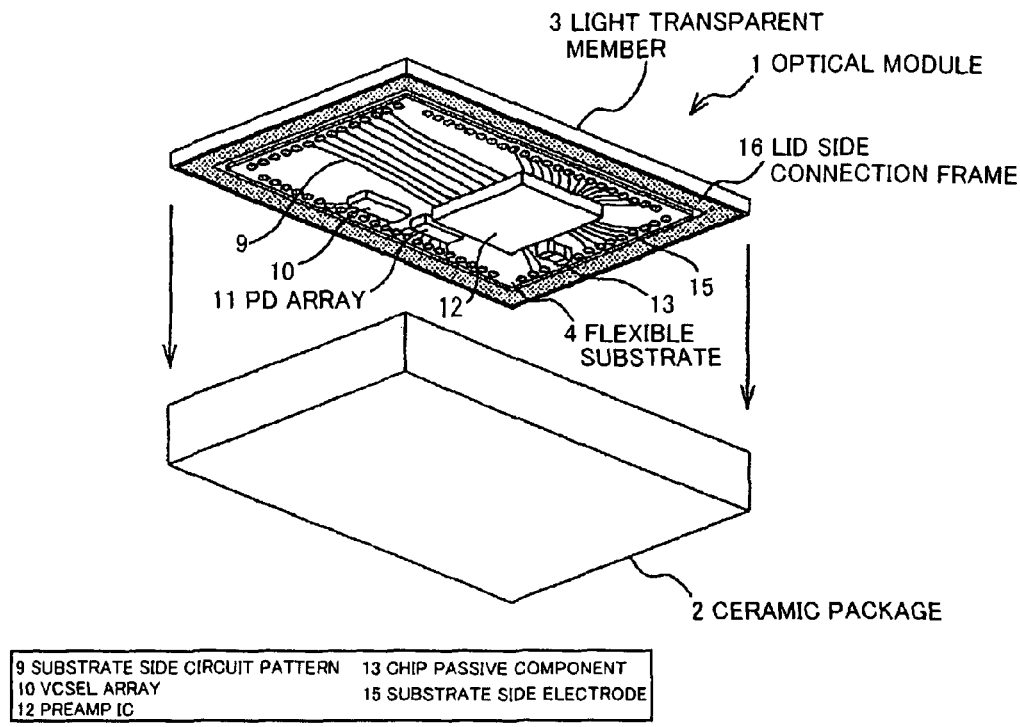
FIG. 8 is an exploded perspective view showing a production method of the optical module 1 shown in FIG. 1.

Then, as shown in FIG. 8, in an inert gas atmosphere (e.g., helium, nitrogen), the package side electrode 7 and the substrate side electrode 15 are connected by solder, and at the same time, the package side connection frame 8 and the lid side connection frame 16 are connected by solder. Thereby, the ceramic package 2 and the light transparent member 3 are connected by hermetically sealing the same.

A reason why the solder is used for connecting the package side connection frame 8 and the lid side connection frame 16 is to keep the level of hermetic sealing less than $10^{-9}$ Pa·m$^3$/s[He] in the leak test. As the solder, for example, an Au—Sn solder or a Sn—Ag solder may be used.

In this case, an adhesive or a synthetic resin cannot be used. That is, since the synthetic resin swells, the VCSEL array 10 and the PD array 11 will be exposed to air and moisture. Thus, the synthetic resin is unsuitable. Further, since a low-melting glass has a possibility to break the VCSEL array 10, the PD array 11, and the preamp 12 mounted on the flexible substrate 4, which have a high-melting point, the low-melting glass is unsuited.

Finally, a plurality of the solder balls 6 are formed on the back surface of the ceramic package 2 in a grid pattern and constitute the BGA, and the optical module 1 shown in FIG. 9 is provided.

An operation of the first exemplary embodiment is described below.

In the optical module 1, four electric signals for driving the VCSEL array 10 transmitted from the mother board or the circuit substrate, is transmitted in order of the circuit pattern 5 of the ceramic package 2, the driver IC 14, and the VCSEL array 10. The four electric signals are respectively converted to optical signals by the VCSEL array 10, then the four optical signals are outputted upwardly from the VCSEL array 10 through the light path R and the light transparent member 3.

On the other hand, in the optical module 1, four optical signals inputted from above of the light transparent member 3 through the light path R and the light transparent member 3 are respectively converted to electric signals by the PD array 11, the four electric signals are transmitted in order of the preamp IC 12, the circuit pattern 5 of the ceramic package 2, and the mother board or the circuit substrate.

A feature of the optical module 1 is to use the flexible substrate 4. The circuit pattern 9, which conventionally has been formed on the transparent plate 194, is formed on at least one surface of the flexible substrate 4, and the flexible substrate 4 is adhered to the light transparent member 3.

Thus, forming of the circuit pattern 9 is easier than the conventional optical module. Consequently, a productivity of manufacturing the optical module 1 is increased and a production cost thereof is decreased.

Figure 19:
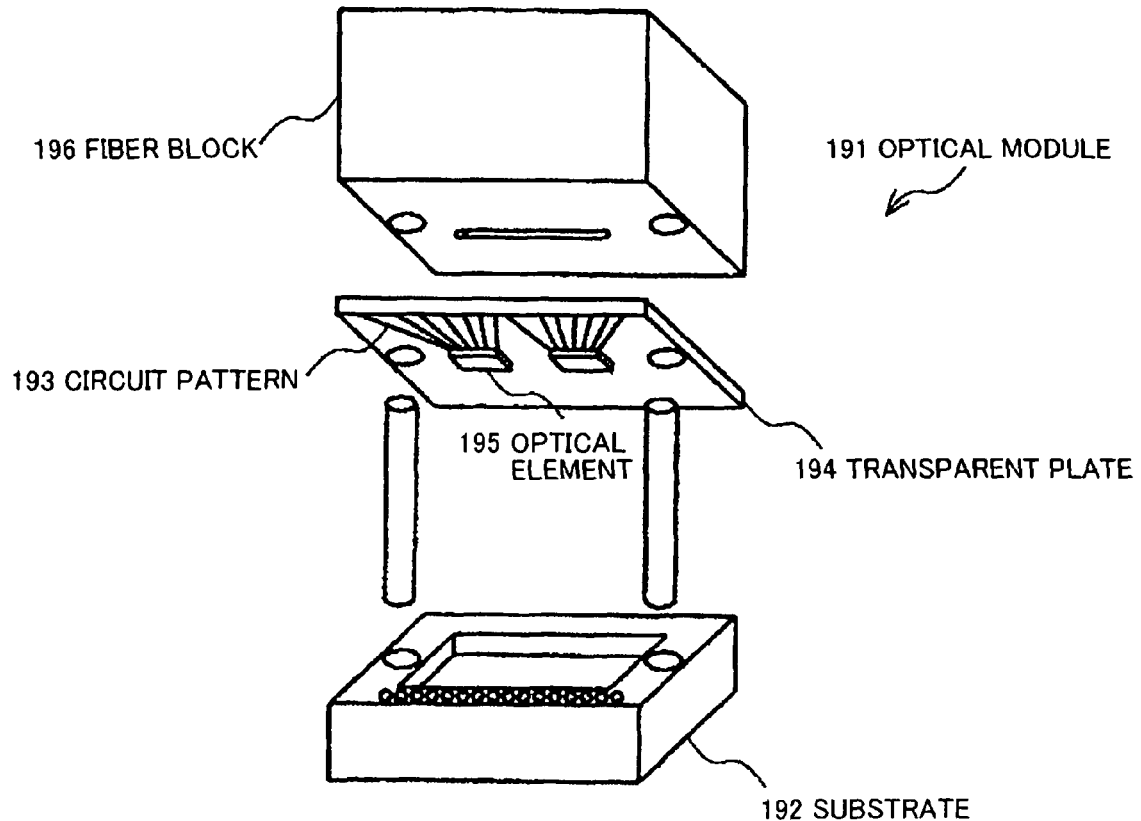
FIG. 19 is an exploded perspective view showing a conventional optical module 191.

Further, when the circuit pattern 9 is formed on both sides of the flexible substrate 4, the flexible substrate 4 can become smaller than the conventional transparent plate 194 shown in FIG. 19. Thus, the optical module 1 can be downsized. Although the example of the one-layer flexible substrate 4 is described in this exemplary embodiment, a packaging density can be further increased by use of a multilayer wiring flexible substrate. Thus, the optical module 1 can be downsized even more.

The thickness of the flexible substrate 4 equal to or less than 0.1 mm is much thinner than that of the conventional transparent plate 194 which is 0.3-1.0 mm. Thus, in the optical module 1, a distance between the VCSEL array 10 or the PD array 11 and the lens for condensing the outgoing light of the VCSEL array 10 or the incoming light of the PD array 11 is not different substantially from the conventional optical module 191. Therefore, even if the LDs or the PDs are arrayed in a narrow pitch, since a beam diameter of the optical signal is not spread, the light does not leak to an adjacent channel. Thus, the optical module 1 can always operate properly.

Further, the optical module 1 includes the package side electrode 7 and the package side connection frame 8 formed on the ceramic package 2, the substrate side electrode 15 formed on the flexible substrate 4, and the lid side connection frame 16 formed on the light transparent member 3.

In the optical module 1, since the package side electrode 7 and the substrate side electrode 15 are connected by solder, and at the same time, the package side connection frame 8 and the lid side connection frame 16 are connected by solder, the inside of the ceramic package 2 is hermetically sealed while connecting the ceramic package 2 and the flexible substrate 4 electrically.

When the circuit pattern 9 is formed on both sides of the flexible substrate 4, for example, the overall ground layer which is formed on the almost entire surface (at least except the light path R) thereof can be used as the circuit pattern 9. Thereby, the optical module 1 can be shielded from a transmission/reception of electromagnetic wave by conducting the overall ground layer with a ground of the mother board and the circuit substrate or a ground layer of the ceramic package 2. Thus, the optical module 1 is resistant to EMI (Electromagnetic Interference).

Further, in the optical module 1, the VCSEL array 10 is mounted on the back surface of the flexible circuit 4, the driver IC 14 for driving the VCSEL array 10 is mounted on the inside bottom surface 2b of the ceramic package 2, and the PD array 11 and the preamp IC 12 for amplifying the output of the PD array 11 are mounted on the back surface of the flexible substrate 4, by three-dimensional packaging and interconnecting.

In the optical module 1, since the preamp IC 12 and the driver IC 14 are separated by mounting the driver IC 12 on the inside bottom surface 2b of the ceramic package 2, the area of the ceramic package 2 for component mounting become smaller, and an increased size of the ceramic package 2 can be prevented. Additionally, a heat arising from the driver IC 14 can efficiently radiate through the ceramic package 2 having a high radiation performance more than the glass or the sapphire glass, a temperature rise of the optical module 1 can be suppressed, and production reliability can become higher.

Further, since an intensity of the optical signal inputted to each PD of the PD array 11 is low, and since a current outputted from the each PD is weak, these can be easily affected by noise. In the optical module 1, the preamp IC 12 is disposed on the flexible substrate 4 so as to decrease an effect of the noise by making the preamp IC 12 closer to the PD array 11.

Since the optical module 1 is three-dimensionally packaged and interconnected, the ceramic package 2 and the flexible substrate 4 can be downsized. Thus, the optical module 1 can be downsized in comparison to the conventional optical module 191 of FIG. 19, and is greatly useful.

In the optical module 1, in the gap between the light transparent member 3 and the VCSEL array 10, the transparent underfill r is filled, and also, in the gap between the light transparent member 3 and the PD array 11, the transparent underfill is filled. Thus, a reflection of light on the back surface of the light transparent member 3 can be prevented, and, at the same time, a junction of the flexible substrate 4 and the VCSEL array 10 and a junction of the flexible substrate 4 and the PD array 11 can be reinforced.

Exemplary Embodiment 2

An optical module 101 shown in FIGS. 10-14 includes an opening 102 which is smaller than an area of the preamp IC 12 and formed on the flexible substrate 4 where the preamp IC 12 is mounted, and the preamp 12 is formed so as to cover the opening 102. As shown in FIG. 14, an underfill r14, including a filler having a high thermal conductivity, is filled in a gap between the light transparent member 3 and the preamp IC 12. A reason is that a power consumption of the preamp IC 12 is more than that of the VCSEL array 10 or the PD array 11. Other configurations of the optical module 101 are the same as the optical module 1 of FIG. 1.

The filler (e.g., alumina) has a high thermal conductivity much more than a base compound of the underfill r14 (e.g., epoxy resin, silicone resin, etc.). Exemplarily, the alumina is used as the filler, and a weight percent thereof is about from 20 to 50 percent. A reason thereof is that, when a content of the filler is more than 50 weight percent, a fluidity is decreased, and when the content of the filler is less than 20 weight percent, the thermal conductivity becomes worse.

An operation of the second exemplary embodiment is described below.

As shown in FIG. 15B, when between the preamp IC 12 and the flexible substrate 4 is simply air, since a heat hb arising from the preamp IC 12 is radiated only through a solder, a heat transmission path (heat transmission area) is small, and a thermal resistance is large.

On the other hand, in the optical module 101, since the underfill r14 is filled between the preamp IC 12 and the flexible substrate 4 as shown in FIG. 15A, a heat h arising from the preamp IC 12 is radiated through the entire underfill r14, the heat transmission path can become large, and the thermal resistance can become small.

Figure 17A:
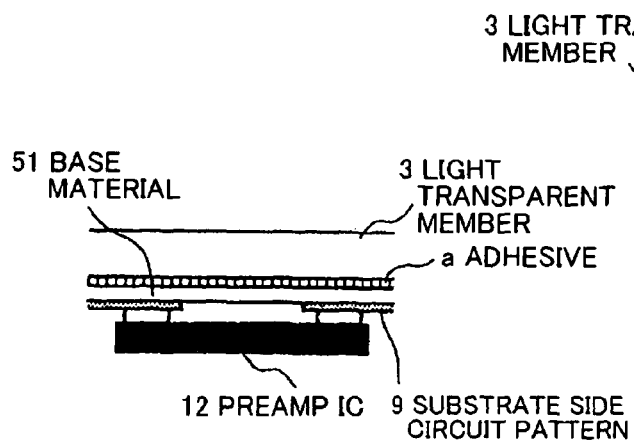
FIG. 17A is an exploded perspective view showing an optical module of a comparative example.
Figure 17B:
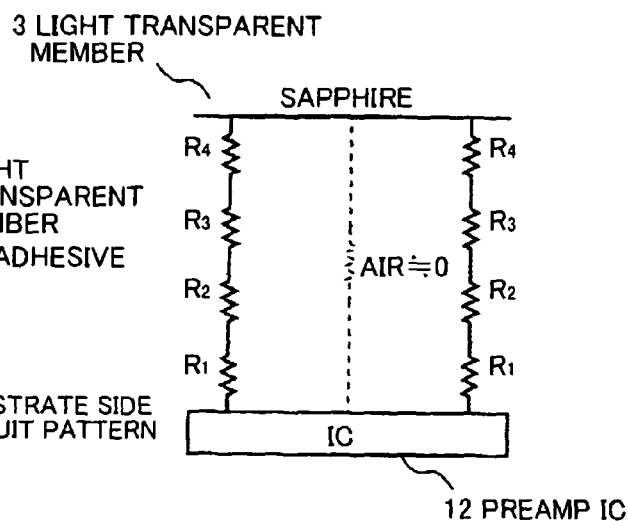
FIG. 17B is a circuit diagram showing a thermal resistance thereof.

Describing the thermal resistance in more detail, when no opening and no underfill (comparative example) are provided as shown in FIGS. 17A and 17B, a thermal resistance RB (° C./W) between the preamp IC 12 and the sapphire substrate as the light transparent member 3 is described with the following equation, when $t_X$ is defined as a thickness of each component, $\lambda_X$ is defined as a thermal conductivity of each component, and $S_X$ is defined as an area of each component.

$$RB=(t_1/\lambda_1 \times S_1)+(t_2/\lambda_2 \times S_2)+\ldots+(t_4/\lambda_4 \times S_4)$$

In this case, suffixes 1 to 4 mean the solder, the circuit pattern 9, the base material (polyimide) 5, and the adhesive a in order thereof.

On the other hand, in the optical module 101, a thermal resistance RA (° C./W) between the preamp IC 12 and the sapphire substrate 3 is, using the same symbols, described as:

$$RA=\{(1/RB)+(1/R_5)\}^{-1}$$

$$R_5=t_5(=t_1+t_2+t_3+t_4)/\lambda_5 \times S_5$$

In this case, the suffix 5 means the underfill r14.

Therefore, RA is less than RB.

Thus, in the optical module 101, since the heat arising from the preamp IC 12 can efficiently radiate through the opening 102 and the underfill r14, the temperature rise of the optical module 101 can be suppressed, and the production reliability can increase. Other operations and effects of this optical module 101 are the same as the optical module 1.

Other Exemplary Embodiments

Figure 18:
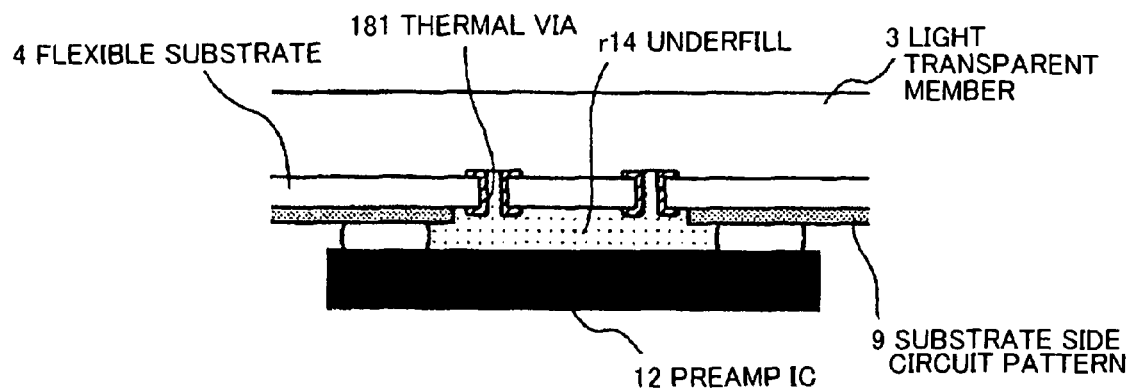
FIG. 18 is an enlarged sectional view showing another exemplary embodiment of optical module 101 of FIG. 10.

As a modification of the optical module 101, as shown in FIG. 18, a plurality of thermal vias 181 can be formed in the flexible substrate 4 where the preamp IC 12 is disposed, and the underfill r14 can be filled in a gap between the light transparent member 3 and the preamp IC 12.

The thermal via 181 is a through hole in which an inner wall is covered by metal (conductor) such as a copper plating and the surface and back surface of the flexible substrate 4 around the through hole is covered by metal such as a copper plating.

Thus, since the heat arising from the preamp IC 12 can efficiently radiate through the thermal via 181 and the underfill r14, the temperature rise of the optical module 101 can be suppressed, and the production reliability can increase.

Further, although exemplary embodiments in which the VCSEL array 10, the PD array 11, the preamp IC 12 and the chip passive component 13 are mounted on the flexible substrate 4 by flip-chip mounting, are described above, these can be mounted on the flexible substrate 4 by face-up mounting.

Additionally, although in the above exemplary embodiments, the preamp IC 12 is mounted on the opening 102 or the thermal via 181, the driver IC 14 can be mounted on the opening 102 or the thermal via 181.

Still further, although in the above exemplary embodiment, the VCSEL array 10, the PD array 11 and the preamp IC 12 are mounted on the back surface of the flexible substrate 4 and the driver IC 14 is mounted on the inside bottom surface of the ceramic package 2b (referring to FIG. 9), the VCSEL array 10, the PD array 11 and the driver IC 14 can be mounted on the back surface of the flexible substrate 4, and the preamp IC 12 can be mounted on the inside bottom surface of the ceramic package 2b. In this case, although an electric interconnection between the PD array 11 and the preamp IC 12 becomes longer than that of the exemplary embodiment of FIG. 9, when a signal transmission rate is less than about 1 Gbit/sec, the optical module can be used reliably.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. An optical module, comprising:
   a package comprising a bottom surface and a peripheral portion extending from the bottom surface to define a cavity in the package;
   a light transparent member disposed on said package;
   a flexible substrate including a circuit pattern formed on at least one side thereof, said flexible substrate being placed on a back surface of said light transparent member;
   a package side electrode formed an upper surface of the peripheral portion of the package;
   a substrate side electrode formed on a back surface of said flexible substrate corresponding to said package side electrode;
   a package side connection frame formed on the upper surface of the peripheral portion of the package, and being formed around said package side electrode; and
   a transparent member side connection frame formed on a frame of the back surface of said light transparent member corresponding to said package side connection frame,
   wherein said package side electrode and said substrate side electrode are connected by solder, and said package side connection frame and said transparent member side connection frame are connected by solder.

2. The optical module according to claim 1, further comprising:
   at least one of a light-receiving optical element and a light-emitting optical element mounted on the back surface of said flexible substrate;
   an opening formed in said flexible substrate;
   at least one of an amplifier circuit for amplifying an output from said light-receiving optical element and a drive circuit for driving said light-emitting optical element disposed so as to cover said opening; and
   an underfill provided in a gap at least one of between said light transparent member and said amplifier circuit and between said light transparent member and said drive circuit.

3. The optical module according to claim 1, further comprising:
   at least one of a light-receiving optical element and a light-emitting optical element mounted on the back surface of said flexible substrate;

a plurality of thermal vias formed on said flexible substrate;

at least one of an amplifier circuit for amplifying an output from said light-receiving optical element and a drive circuit for driving said light-emitting optical element disposed on said thermal vias; and an underfill provided in a gap at least one of between said light transparent member and said amplifier circuit and between said light transparent member and said drive circuit.

4. The optical module according to claim 1, further comprising:

a light-receiving optical element and a light-emitting optical element mounted on the back surface of said flexible substrate;

an amplifier circuit for amplifying an output from said light-receiving optical element, said amplifier circuit being mounted on the back surface of said flexible substrate; and a drive circuit for driving said light-emitting optical element, said drive circuit being mounted on an inside bottom surface of said package.

5. The optical module according to claim 1, further comprising:

a light-receiving optical element and a light-emitting optical element mounted on the back surface of said flexible substrate;

a drive circuit for driving said light-emitting optical element, said drive circuit being mounted on the back surface of said flexible substrate; and an amplifier circuit for amplifying an output from said light-receiving optical element, said amplifier circuit being mounted on an inside bottom surface of said package.

6. The optical module according to claim 1, further comprising:

a light-receiving optical element and a light-emitting optical element mounted on the back surface of said flexible substrate; and an underfill which is transparent and provided in a gap between said light transparent member and at least one of said light-receiving optical element and said light-emitting optical element.

7. The optical module according to claim 1, wherein said light transparent member includes an inorganic material substrate which has a thermal conductivity more than 20 W/(mk).

8. The optical module according to claim 1, wherein said light transparent member includes a sapphire glass substrate in which at least one of crystal plane orientations is shifted over 0.5°.

9. The optical module according to claim 7, wherein said inorganic material substrate which has a thermal conductivity of less than 50 W/(mk).

10. The optical module according to claim 8, wherein sapphire glass substrate comprises a single crystal of alumina ($Al_2O_3$).

* * * * *